United States Patent

Katayama et al.

[11] Patent Number: 5,815,159
[45] Date of Patent: Sep. 29, 1998

[54] SPATIALLY MAPPED MONOCHROME DISPLAY IN A COLOR IMAGE

[75] Inventors: Andrew Setsu Katayama, Cardiff-by-the-Sea; Gregory James Martin, Carlsbad, both of Calif.

[73] Assignee: Eastman Kodak Company, Rochester, N.Y.

[21] Appl. No.: 620,434

[22] Filed: Mar. 22, 1996

[51] Int. Cl.⁶ .................................................. G06T 5/00
[52] U.S. Cl. .................................... 345/431; 345/153
[58] Field of Search .................................. 395/131, 132; 345/147, 153, 149, 150, 431, 432, 152–154; 348/630, 645, 646, 651, 649, 791

[56] References Cited

U.S. PATENT DOCUMENTS

| | | | |
|---|---|---|---|
| 5,153,576 | 10/1992 | Harrington | 340/793 |
| 5,227,863 | 7/1993 | Bilbrey et al. | 348/578 |
| 5,282,063 | 1/1994 | Deacon et al. | 358/479 |
| 5,452,017 | 9/1995 | Hickman | 348/646 |

*Primary Examiner*—Mark K. Zimmerman
*Assistant Examiner*—Motilewa Good-Johnson
*Attorney, Agent, or Firm*—William F. Noval

[57] ABSTRACT

A method of displaying a color image on a color display comprising the steps of: providing a digital color image signal which is a matrix of pixels, each pixel having first, second, and third color components; for each pixel, determining whether or not two of the three color components are in saturation, and, if they are, setting the signal level for each of the two color components at the signal level of the other of the three color components; and displaying said color image pixel as a monochrome pixel.

4 Claims, 2 Drawing Sheets

GRGRGRGRGRGRBGBGBGBGBGGRGRGRGRGRGR

SPATIALLY MAPPED MONOCHROME DISPLAY IN A COLOR IMAGE

FIELD OF THE INVENTION

This invention relates in general to color image processing and relates more particularly to automatic monochrome spatial switching in a color image to control artifacts and extend display dynamic range.

BACKGROUND OF THE INVENTION

In one type of color imaging array as disclosed in U.S. Pat. No. 3,971,065, issued Jul. 20, 1976, inventor Bayer, a mosaic of selectively transmissive filters is superposed in registration with a solid state imaging array having a broad range of light sensitivity. The distribution of filter types in the mosaic is such that one color, such as green, representing a luminance signal, predominates over filters for other colors such as red and blue. Thus, in one filter format, the green filters alternate both horizontally and vertically with either a blue filter or a red filter. Thus, half of the pixels represent green, while a quarter each of the remaining pixels represent red and blue. The filter format can be selected to represent different proportions of green, red, and blue. In such a color imaging array, the individual pixels must be processed by means of a color matrix in order to produce a color signal having parallel red, blue and green components which can be used to display the image on a color monitor.

In a known color imaging system, pixel data from a Bayer-encoded image is collected in a video frame store as 8-bit quantities. The data represents the differently colored pixels in the image. Due to a nonuniform sensor spectral response, and a spectrally non-uniform light source, there is saturation in the three color channels at different times when viewing a color neutral object. Typically, green and red saturate long before the blue channel saturates. When saturation takes place, the data stored in the video frame store is fixed at a value of 255, the largest value which an 8-bit quantity can represent in an 8-bit system. This data is then spatially processed to create three 8-bit quantities for each pixel supplied from the frame store. The 24-bit data is then processed in a matrix multiplier for white balance and color correction. The output of the multiplier was a signed 12-bit number per color component (36 bits total). If the value of the 12-bit number was between 0–255 the pixel data was left alone. If the 12-bit number was negative, the pixel data was set to an 8-bit zero. If the 12-bit number exceeded 255, the pixel data was set to 255. The resultant 24-bit pixel data was then sent to display electronics for eventual display on a color monitor.

A problem arose in the referenced system when two of the three color channels were in saturation. Because the matrix multiplier operates to create a full 3-channel color output, even though some of the channels were not responding, false coloration resulted in the image areas where some saturation occurred. The false coloration occurred mostly when two of the channels were in saturation. Setting all three channels to a maximum value, producing a pure white display was not entirely satisfactory, since the original color of the image was discarded as well as any image detail information in the saturated pixels. Thus, since the blue channel saturated so much later than the red and green channels, any detail in the blue channel was not shown, except as a flat pure white.

SUMMARY OF THE INVENTION

According to the present invention there is provided a solution to the problems discussed above.

According to a feature of the present invention, there is provided a method of displaying a color image on a color display comprising the steps of:

providing a digital color image signal which is a matrix of pixels, each pixel having first, second, and third color components;

for each pixel, determining whether or not two of the three color components are in saturation, and, if they are, setting the signal level for each of the two color components at the signal level of the other of the three color components; and displaying said color image pixel as a monochrome pixel.

The invention has the following advantages.

1. When two color components of a color pixel to be displayed saturate, the pixel will be displayed as a monochrome at a reduced signal level which depicts image information.

2. The saturation induced monochrome area of a displayed color image may be delineated on its borders by a single color, such as red.

DESCRIPTION OF THE INVENTION

Figures 1, 2:
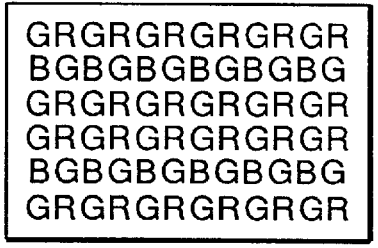
FIG. 1 is a diagrammatic view of a color sensor using a Bayer type color filter array.
FIG. 2 is a diagrammatic view depicting a sequence of pixels read from the first three lines of the sensor of FIG. 1.

Referring now to FIG. 1, there is shown a diagrammatic view of a color image sensor 10 having a color filter array having a repeating pattern of pixel sized color filters disposed over an array of photosensors having a broad spectral range. The filter pattern shown has a repeating color filter pattern of G(Green)R(Red) in the first line; a repeating color filter pattern of B(Blue)G in the second line; and a repeating color filter pattern of GR in the third line. The color filter pattern shown produces $3/6$ G pixels, $2/6$ R pixels, and $1/6$ B pixels. It will be understood that the color filter pattern shown is exemplary only and that other patterns can be used.

FIG. 2 is a diagrammatic view of a sequence of pixels which have been read out from the first three lines of sensor 10. For illustration purposes, it is assumed that each pixel has been digitized to a pixel depth of 8 bits. Since each pixel only represents a single color, i.e., G, R, or B, in order to preserve the resolution of the image when it is to be displayed in full color on a color video display, each pixel is processed in a color matrix so that three 8-bit color components are produced for each pixel (24 bits per pixel).

Figure 3:
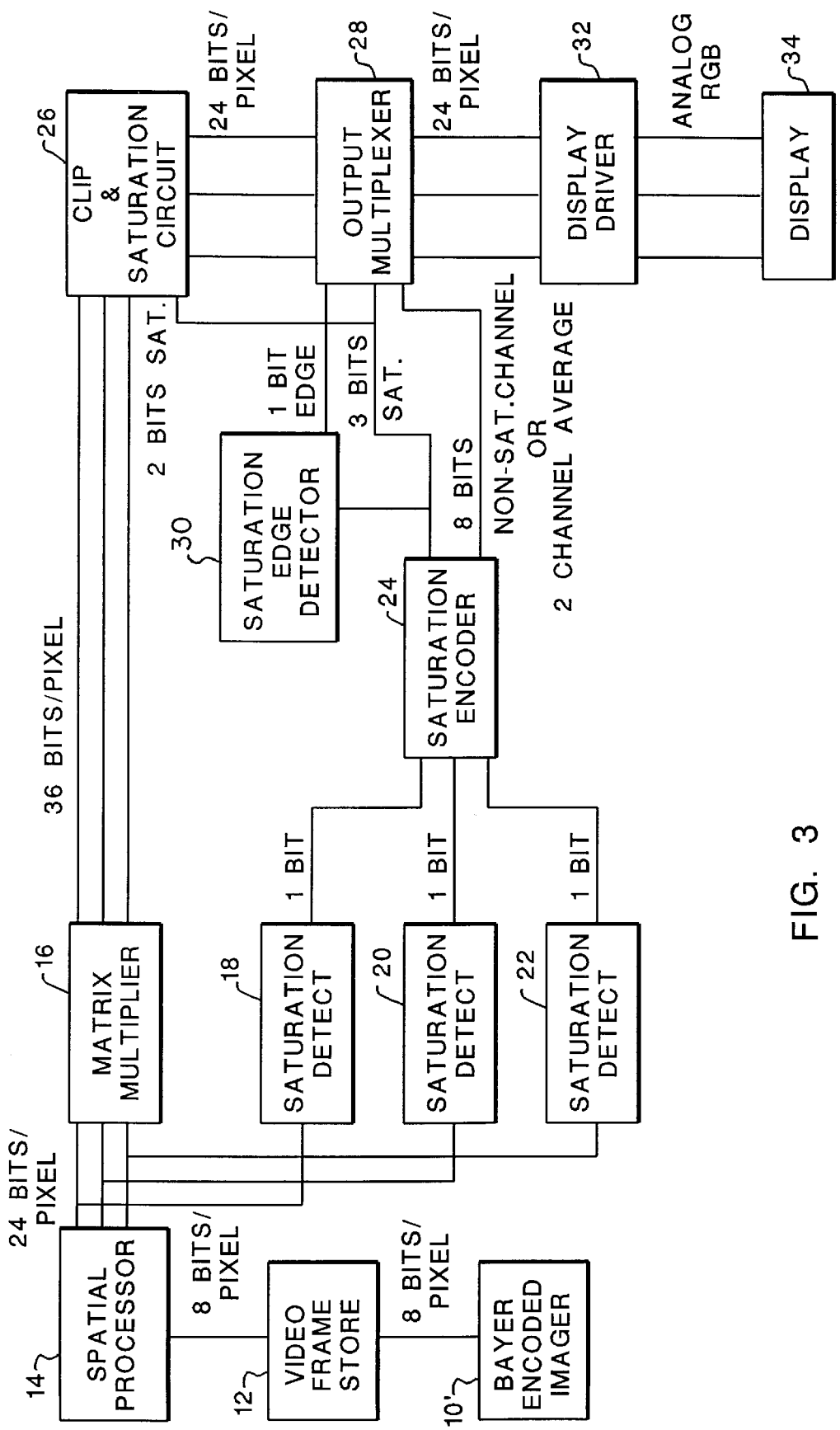
FIG. 3 is a block diagram of a color imaging system incorporating the present invention.

A color imaging system incorporating the present invention is shown in FIG. 3. As shown, a Bayer encoded imager 10' produces a digital image signal having 8-bits per pixel. Each pixel represents one of the colors R, G, B. The digital pixels from imager 10' are stored in video frame store 12. Spatial processor 14 processes each 8-bit pixel into a 24-bit pixel having 8-bits each representing the colors RGB. The 24-bit pixel is then processed by matrix multiplier 16 whose coefficients are chosen to both white balance and color correct the pixel data. The output from matrix multiplier 16 is a 36bit, 12 bits per color, per pixel signal.

The present invention is based on the observation that when saturation occurs in the color imaging system that essentially what resulted was essentially a monochrome image. The best way to display such an image is as a monochrome. However if the green and red channels saturate in a neutral area, the implication is that the blue channel would also wind up saturating after white balancing in matrix multiplier 16. This result is due to the fact that the blue channel would receive the gain necessary to produce an equal code value to the other two channels. According to the invention, in those areas where the source image "collapsed" to a monochrome, the gain would be reduced. This has the advantage of extending the dynamic range by the factor which would have been applied had saturation not occurred. A further feature of the invention is to highlight with red the left and right edges of the segments of the displayed image which are to be displayed as a monochrome.

According to the present invention, the three 8-bit color components of the pixel are processed by saturation detectors 18, 20, 22 to determine which if any of the color channels for a pixel are saturated, i.e., whether the channel exceeds a preselected signal level, e.g., 255. If a detector 18, 20, 22 detects saturation, it produces a 1 bit signal at its output, if not, it produces a 0 bit. The outputs from detectors 18, 20, 22 are processed by saturation encoder 24 to produce a 2-bit saturation signal. According to a feature of the present invention, the saturation encoder 24 is programmed as follows.

If the R and G, or if the R, G, and B channels are saturated, (i.e., are a 1-bit), saturation encoder 24 produces a 2-bit saturation signal binary 11 or decimal 3.

If the R and B channels are saturated, saturation encoder 24 produces a saturation binary 10 or decimal 2.

If the G and B channels are saturated, saturation encoder 24 produces a saturation signal binary 01 or decimal 1.

Otherwise, saturation encoder 24 produces a saturation signal binary 00 or decimal 0.

The saturation signal is synchronized with the image data from matrix multiplier 16 and fed with it clip and saturation circuit 26. Circuit 26 operates as follows. If the data in any channel is negative, it is clipped to an 8-bit 0. If the saturation signal is greater than 0, indicating that the color pixel is in a monochrome area, then the input value on the remaining channel bypasses the matrix multiplier, thus bypassing the gain required to white balance. This result is then analyzed to see if the signal level exceeds 255. If it does then that channel is clipped to 255 and used in all of the channels. If not, the output of the indicated channel is sent to all three output channels, resulting in a monochrome output. If it is determined that the pixel is not in a monochrome area, then each of the three channels are checked to determine if its signal value exceeds 255. Then, the output is limited to 255 if it does, and passed through to the output, if it does not.

Circuit 26 outputs a three channel 24-bit signal to output multiplexer 28. Multiplexer 28 is also supplied with the saturation signal from saturation encoder 24 and an edge detector signal from edge detector 30. Edge detector 30 looks at the 2-bit saturation signal and produces a 1-bit edge signal that is set at "1" if it indicates the left or right edge of a monochrome area on one of the red, green, or blue channels, or a "0" otherwise.

Circuit 28 operates as follows. If the saturation signal is a decimal 3, then the three output channels are set to the signal level of the blue component before the matrix multiplier. If the saturation signal is a decimal 2, then the three output channels are set to the signal level of the green component before the matrix multiplier. If the saturation signal is a decimal 1, then the three output channels are set to the signal level of the red component before the matrix multiplier. In addition to the above, if an edge is detected, the green and blue components are set to 0 and the red component is set to the value of the red component before the matrix multiplier which did not saturate.

The three color channels are supplied to a display board 32 which produces analog R,G,B signals fed to display 34 for displaying a color image which is modified as set forth above in areas which are saturated.

According to another feature of the present invention, if only one color component saturates, in such areas, the two non-saturated color components are averaged, and the three output channels are set to such average value. By doing this, the false coloration, which would result from one of the three color components saturating, is avoided. In such a case, saturation encoder produces a 3-bit saturation signal, wherein a decimal 5, 6,or 7 or binary 101, 110 or 111 is produced if only one of the red, green, or blue channels saturates, respectively.

The invention has been described in particular embodiments above but it will be understood that modifications and variations are within the scope of the invention.

What is claimed is:

1. A method of displaying a color image on an electronic color display comprising the steps of:

providing a digital color image signal which is a matrix of pixels, each pixel having first, second, and third color components;

for each pixel, determining whether or not two of the three color components are in saturation, and, if they are, setting the signal level for each of the three color components at the signal level of the third color component; and displaying said color image pixel as a monochrome pixel on an electronic color display;

and, if they are not, displaying said color pixel as a color pixel on said electronic color display.

2. The method of claim 1 wherein said determining step includes the step of determining whether a pixel delineates the bounds of the area that would have saturated, and if it is, setting the signal level of the first and second color components to 0 and displaying the pixel determined to be a boundary only in said third color component.

3. The method of claim 1 wherein said providing step includes providing a digital image signal which is a matrix of pixels, wherein first, second. and third sets of pixels, respectively, represents only one color component of first, second, and third color components, and including the step of processing each pixel of a single color component to produce a pixel having said first, second, and third color components.

4. A method of displaying a color image on an electronic color display comprising the steps of:

providing a digital color image signal which is a matrix of color pixels, each color pixel having first, second, and third color components;

for each color pixel, determining whether or not one of the three color components is in saturation, and, if it is, averaging the signal levels of the other two color components to produce an average signal level, and setting the signal level for all three color components at the average signal level; and displaying said color image pixel as a monochrome pixel on an electronic color display:

and, if they are not, displaying said color pixel as a color pixel on said electronic color display.

* * * * *